United States Patent
Angelechio et al.

(10) Patent No.: US 12,252,181 B1
(45) Date of Patent: Mar. 18, 2025

(54) SEAT ADAPTER FOR MOBILITY CONVERSION VEHICLES

(71) Applicant: Vantage Mobility, LLC, Phoenix, AZ (US)

(72) Inventors: Philip Clement Angelechio, Phoenix, AZ (US); Steven Paul Ungetheim, Phoenix, AZ (US); Kirsten Nichole Mangum, Phoenix, AZ (US); Christopher William Sack, Phoenix, AZ (US)

(73) Assignee: Vantage Mobility, LLC, Phoenix, AZ (US)

( * ) Notice: Subject to any disclaimer, the term of this patent is extended or adjusted under 35 U.S.C. 154(b) by 0 days.

(21) Appl. No.: 18/883,055

(22) Filed: Sep. 12, 2024

Related U.S. Application Data

(60) Provisional application No. 63/538,965, filed on Sep. 18, 2023.

(51) Int. Cl.
*A61G 3/08* (2006.01)
*B60N 2/005* (2006.01)
*B62D 25/20* (2006.01)
*B62D 65/02* (2006.01)

(52) U.S. Cl.
CPC ........... *B62D 25/20* (2013.01); *A61G 3/0808* (2013.01); *B60N 2/005* (2013.01); *B62D 65/02* (2013.01)

(58) Field of Classification Search
CPC ........ A61G 3/08; A61G 3/0808; B62D 25/20; B62D 25/2027; B62D 65/02; B60N 2/005; B60N 2/24; B60N 2/90
USPC ..................... 296/63, 65.4, 193.07
See application file for complete search history.

(56) References Cited

U.S. PATENT DOCUMENTS

| | | | |
|---|---|---|---|
| 11,819,463 B2 * | 11/2023 | Bartos | B62D 63/025 |
| 2020/0129350 A1 * | 4/2020 | Collett | B60P 1/433 |
| 2023/0372168 A1 * | 11/2023 | Svec | B62D 65/00 |

* cited by examiner

*Primary Examiner* — Joseph D. Pape
(74) *Attorney, Agent, or Firm* — Fennemore Craig, PC

(57) ABSTRACT

A seat adapter for a mobility assist vehicle includes a top member that defines mounting locations thereon sized to receive an OEM seat mount for an OEM seat of the mobility assist vehicle. A right side member mounted to a lower surface of the top member extends generally downwardly from the lower surface and defines at least one mounting location thereon to allow the right side member to be mounted to a floor tub assembly of the mobility assist vehicle. A left side member mounted to the lower surface extends generally downwardly from the lower surface of the top member in spaced-apart relation to the right side member. The left side member defines at least one mounting location thereon to allow the left side member to be mounted to the floor tub assembly.

27 Claims, 11 Drawing Sheets

SEAT ADAPTER FOR MOBILITY CONVERSION VEHICLES

CROSS-REFERENCE TO RELATED APPLICATION

This application claims the benefit of U.S. Provisional Patent Application No. 63/538,965, filed on Sep. 18, 2023, which is hereby incorporated herein by reference for all that it discloses.

TECHNICAL FIELD

The present invention relates to mobility assist conversion vehicles in general and more specifically to mobility assist conversion vehicles having lowered floor sections extending across multiple seating rows.

BACKGROUND

Mobility assist or wheelchair accessible vehicles are well-known in the art and are commonly provided with mobility access systems, such as deployable lifts or ramps, to allow persons requiring wheelchairs or other types of mobility assist systems to readily enter the vehicles, either to drive the vehicles or to ride along. Many such vehicles have rear-deploying lifts or ramps, wherein the lift or ramp extends and retracts from the rear of the vehicle. In other vehicles, the lift or ramp may be deployed from the side of the vehicle.

Most mobility assist or wheelchair accessible vehicles are converted from OEM (original equipment manufacturer) vehicles, commonly minivans, although other types of vehicles, such as sport utility vehicles (SUVs) and vans are also converted for such use. A rear entry mobility conversion vehicle may be made in two forms or 'cuts,' a first or short form or cut and a second or long form or cut. In either type of conversion, i.e., either a short or long form conversion, a portion of the floor of the OEM vehicle is removed and replaced with a lowered floor or 'tub' assembly. The floor tub assembly defines a lowered floor section that is sized to accommodate within the vehicle a typical wheelchair or other mobility assist system.

In a short form conversion, the lowered floor section of the tub assembly extends from the rear door(s) of the vehicle up to just behind the second row seating area. Thus, in a short form conversion, the wheelchair or other mobility assist system will be accommodated in the third row seating area of the OEM vehicle. The second row seating area may remain in its original configuration. In some conversions, one or more smaller or reduced-size seats may also be provided in the third row seating area, typically alongside the lowered floor section.

In a long form conversion, the lowered floor section of the tub assembly extends from the rear door(s) of the vehicle up to just behind the first row seating area of the OEM vehicle. Therefore, in a long form conversion, the wheelchair or other mobility assist system may be accommodated in either the third row seating area or the second row seating area. In addition, the floor tub of most long form conversion vehicles is of sufficient length so that two wheelchairs or mobility assist systems may be accommodated in a tandem arrangement, with one of the wheelchairs being located in the second row seating area and the other being located in the third row seating area. Most long form conversion vehicles may also accommodate a medical stretcher or cot in the lowered floor area created by the floor tub assembly. In some long form conversions, one or more smaller or reduced-size seats may also be provided in one or both of the second and third row seating areas, again typically alongside the lowered floor section defined by the tub assembly. However, due to the presence of the lowered floor, long form vehicles cannot accommodate the OEM vehicle seats in either the second or third row seating areas.

In addition, and for a given OEM vehicle, the long and short form conversions are typically manufactured with completely different parts, including the modified floor or tub assembly, as well as modified or revised fuel systems, HVAC systems, brake lines, exhaust systems, and the like.

SUMMARY

One embodiment of a seat adapter assembly for a mobility assist vehicle may include a top member. A right side member mounted to a right side portion of the top member extends generally downwardly from the top member and defines at least one mounting location thereon to allow the right side member to be mounted to a floor tub assembly of the mobility assist vehicle. A left side member mounted to a left side portion of the top member extends generally downwardly from the top member and defines at least one mounting location thereon to allow the left side member to be mounted to the floor tub assembly. A front member mounted to a front portion of the top member extends between the top member and the lowered floor section of the floor tub assembly when the seat adapter is located in an installed position within the floor tub assembly. A rear member mounted to a rear portion of the top member extends between the top member and the lowered floor section of the floor tub assembly when the seat adapter is located in the installed position.

Also disclosed is a seat adapter for a mobility assist vehicle that may include a top member having an upper surface and a lower surface. The top member defines mounting locations thereon that are sized to receive an OEM seat mount for an OEM seat of the mobility assist vehicle. A right side member mounted to the lower surface of the top member extends generally downwardly from the lower surface of the top member and defines at least one mounting location thereon to allow the right side member to be mounted to a floor tub assembly of the mobility assist vehicle. A left side member mounted to the lower surface of the top member extends generally downwardly from the lower surface of the top member and is in spaced-apart relation to the right side member. The left side member defines at least one mounting location thereon to allow the left side member to be mounted to the floor tub assembly.

A method of converting a mobility assist vehicle to receive an OEM seat may include: Providing the a adapter assembly; positioning the seat adapter assembly in the floor tub assembly of the vehicle; securing the right side member of the seat adapter assembly to the floor tub assembly; and securing the left side member of the seat adapter assembly to the floor tub assembly.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

The following is a detailed description of exemplary embodiments that illustrate the principles of the disclosed instrumentalities. The embodiments are provided to illustrate various aspects of the disclosed instrumentalities. However, the disclosed instrumentalities should not be regarded as limited to any particular embodiment or combination of features. The disclosed instrumentalities teach by way of example and not by limitation. Therefore, the scope of the disclosed instrumentalities encompasses numerous alternatives, modifications, and equivalents.

Figure 1:
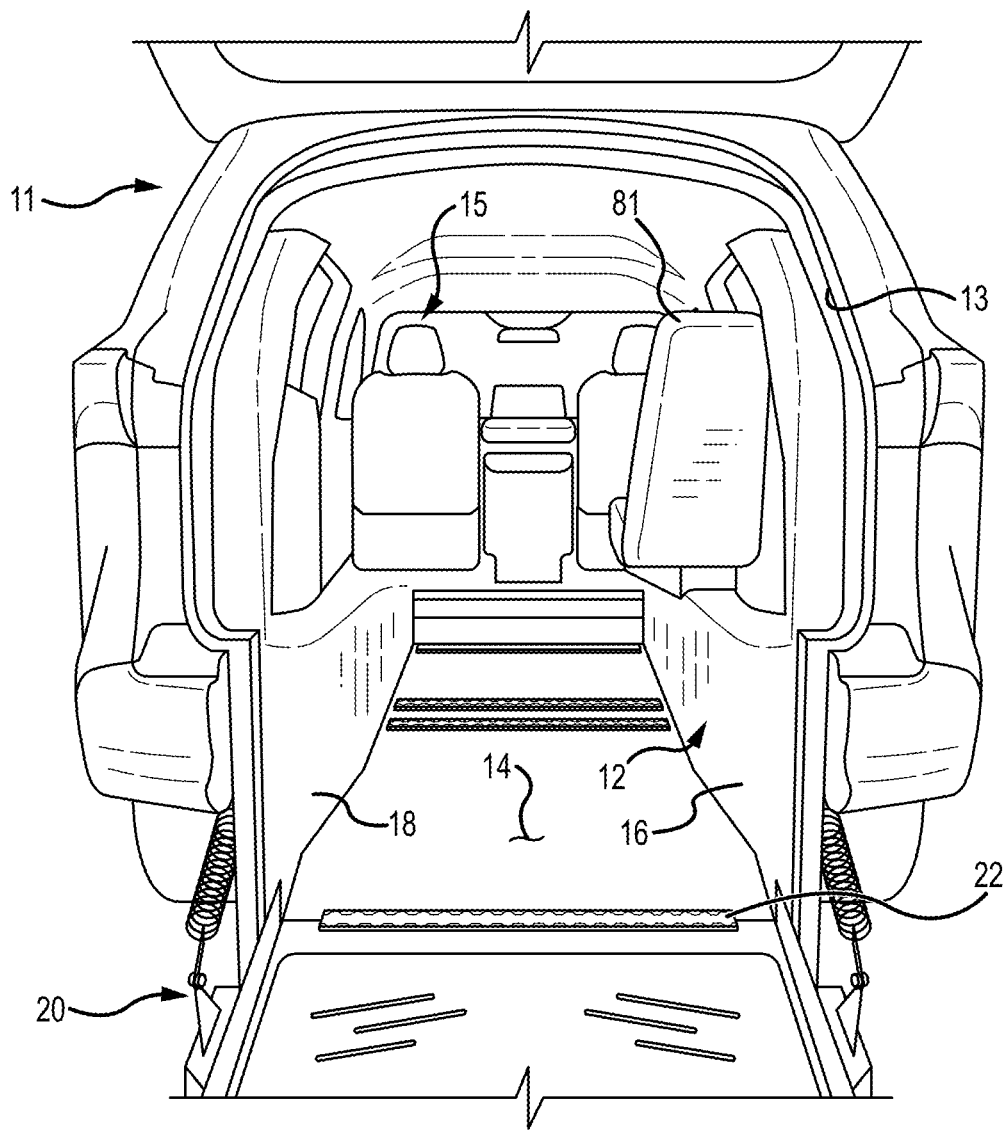
FIG. 1 is a rear view of a mobility assist conversion vehicle having a lowered floor section that extends from the rear hatch of the vehicle to a position just behind the first row seating area.
Figure 2:
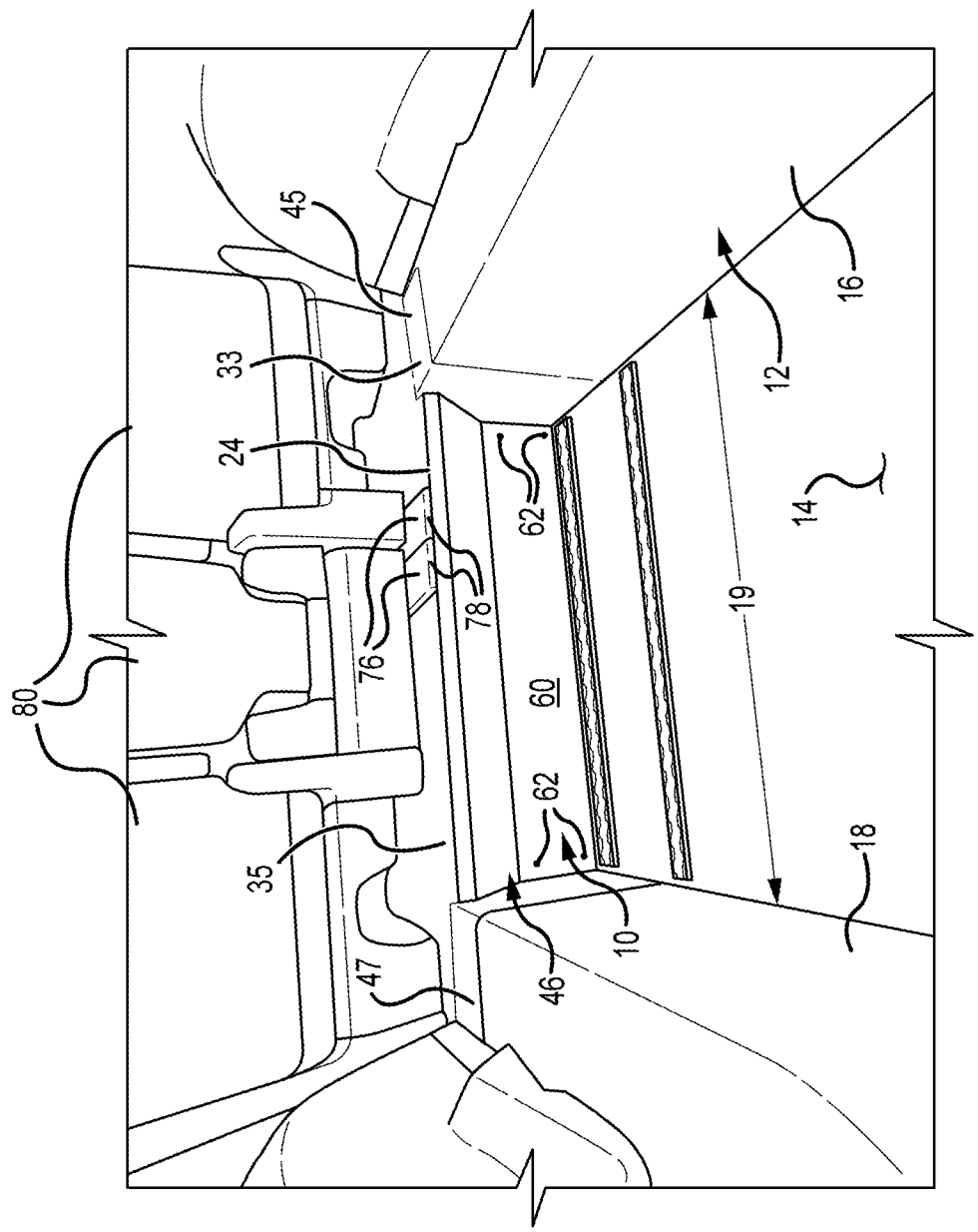
FIG. 2 is a close-up view of the lowered floor section of the mobility assist conversion vehicle illustrated in FIG. 1 with one embodiment of a seat adapter assembly mounted in the installed position and with second row OEM seats mounted thereto.

Referring to FIGS. 1 and 2, one embodiment of a seat adapter assembly 10 (FIG. 2) for a mobility assist vehicle is shown and described herein as it could be used in conjunction with a mobility assist conversion vehicle 11, i.e., an OEM vehicle that has been converted to accommodate one or more mobility assist systems, such as a wheelchair. See FIG. 1. In the particular embodiments shown and described herein, the mobility assist conversion vehicle 11 comprises a long form or long cut conversion vehicle, wherein a portion of the floor of the OEM vehicle has been removed and replaced with a lowered floor tub assembly 12. The floor tub assembly 12 extends from about a rear opening 13 of conversion vehicle 11 to a position just aft or behind the first row seating position 15 of conversion vehicle 11. Alternatively, and as will be described in further detail herein, seat adapter assembly 10 could be used in conjunction with other types of mobility assist vehicles, such as short form vehicle conversions.

Still referring to FIG. 1, floor tub assembly 12 may comprise a lowered floor section 14 sized to receive one or more mobility assist systems, such as a wheelchair (not shown). In the particular embodiment illustrated in FIG. 1, the lowered floor section 14 of floor tub assembly 12 has a length sufficient to accommodate two wheelchairs in a tandem arrangement (not shown) or a medical stretcher (also not shown). Floor tub assembly 12 may include or define a right side wall 16 that extends generally upwardly from the lowered floor section 14 as well as a left side wall 18 that also extends generally upwardly from the lowered floor section 14. A deployable ramp assembly 20 mounted to a rear portion 22 of floor tub assembly 12 may be extended and retracted through rear opening 13 of mobility assist vehicle 11.

Referring now primarily to FIGS. 2-4 and 6, seat adapter assembly 10 may comprise a top member 24 that defines at least a front portion 26, a rear portion 28, a left side portion 30, and a right side portion 32. A right side member 34 is mounted to the right side portion 32 of top member 24 so that right side member 34 extends generally downwardly from top member 24. See FIGS. 3 and 6. Right side member 34 may define one or more mounting locations 36 thereon to allow right side member 34 to be mounted or secured to floor tub assembly 12 when seat adapter assembly 10 is located in an installed position 46. See FIG. 3.

Seat adapter assembly 10 may also comprise a left side member 40. Left side member 40 may be mounted to the left side portion 30 of top member 24 so that left side member 40 extends generally downwardly from top member 24. Left side member 40 may also define one or more mounting locations 36 thereon to allow left side member 40 to be mounted or secured to floor tub assembly 12 when seat adapter assembly 10 is located in installed position 46.

Figure 3:
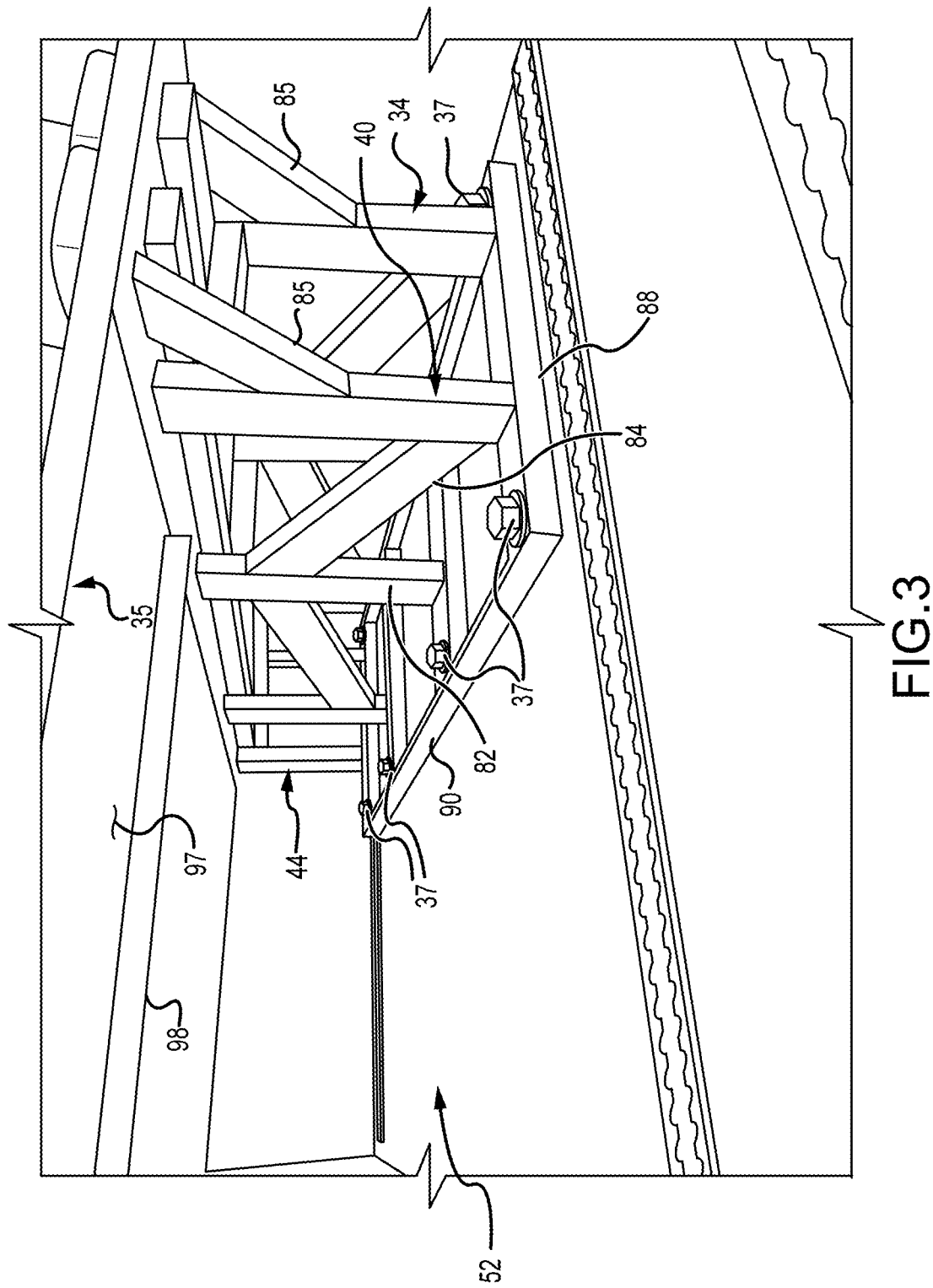
FIG. 3 is an enlarged perspective view of the seat adapter assembly illustrated in FIG. 2 with the rear member removed to show the right and left side members.
Figure 6:
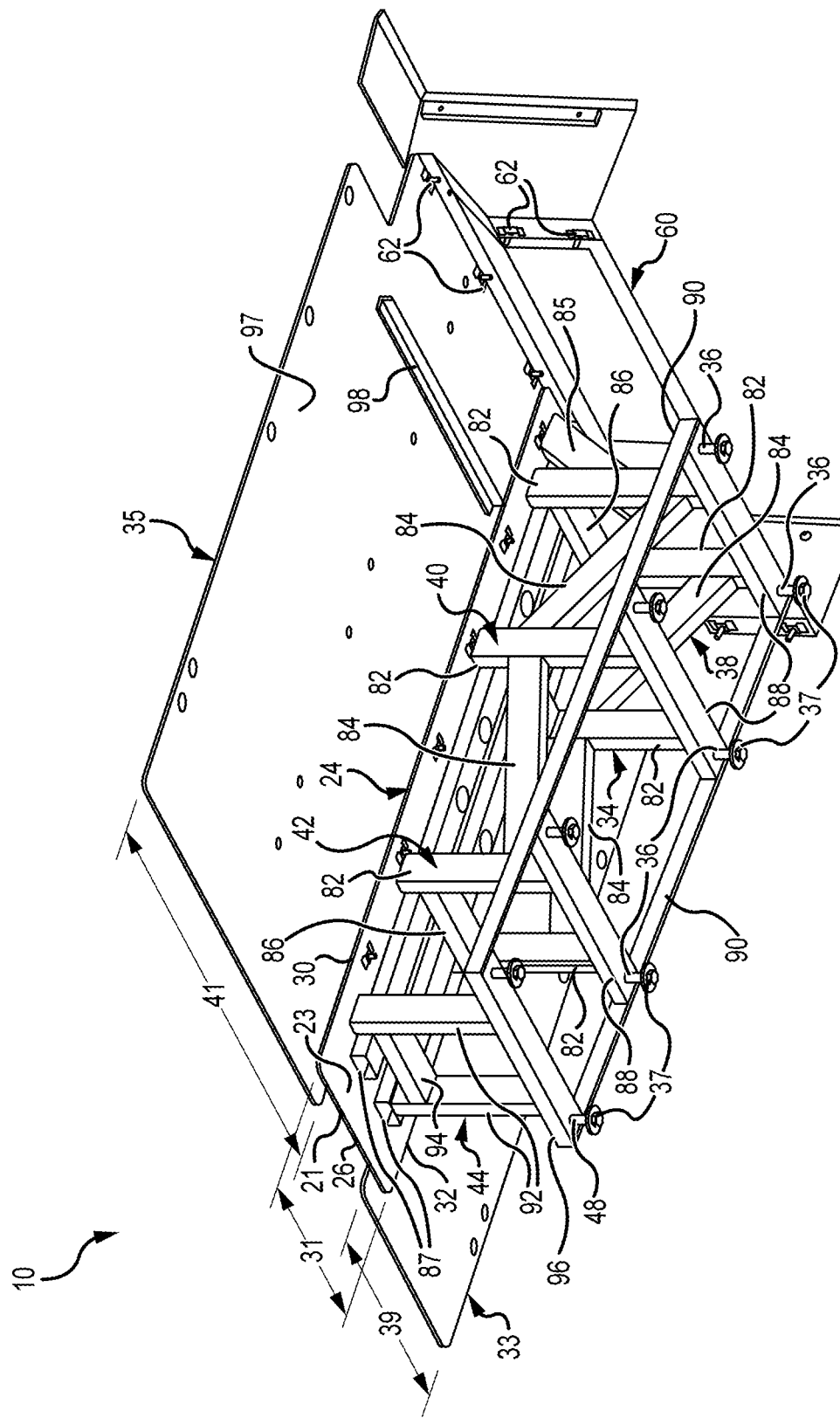
FIG. 6 is an isometric view of the bottom side of the seat adapter assembly.

In some embodiments, seat adapter assembly 10 may also include a front member 44, as best seen in FIGS. 3 and 6. Front member 44 may be mounted to the front portion 26 of top member 24 so that front member 44 extends generally downwardly from top member 24. Front member 44 is sized so that it extends between top member 24 and the lowered floor section 14 of floor tub assembly 12 when seat adapter assembly 10 is located in installed position 46. Front member 44 may define one or more mounting locations 48 thereon to allow front member 44 to be mounted or secured to floor tub assembly 12.

Figure 4:
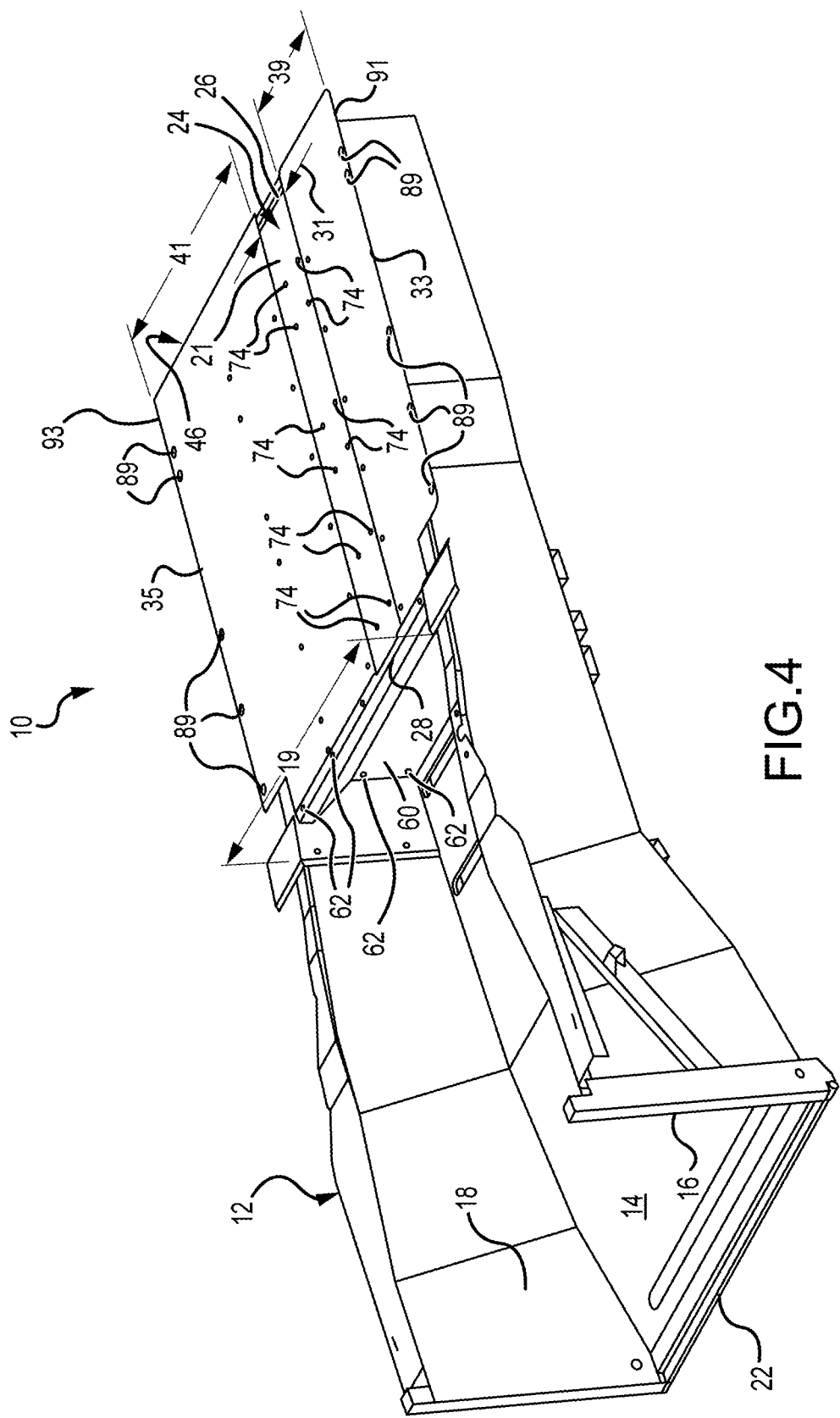
FIG. 4 is an isometric view of the top side of the floor tub assembly of the mobility assist conversion vehicle depicted in FIG. 1 with the seat adapter assembly shown in the installed position.

Seat adapter assembly 10 may also include a rear member 60. Rear member 60 may be mounted to rear portion 28 of top member 24 so that rear member 60 extends generally downwardly from top member 24 to lowered floor section 14 of floor tub assembly 12 when seat adapter assembly 10 is located in the installed position 46, as best seen in FIGS. 2 and 4. Rear member 60 therefore encloses interior region 52 defined between lowered floor section 14 and seat adapter assembly 12. Rear member 60 may define one or more mounting locations 62 thereon to allow rear member 60 to be removably mounted or secured to seat adapter assembly 10 to allow access to interior region 52, e.g., to facilitate installation and removal of seat adapter assembly 10. See FIG. 3.

With reference now primarily to FIG. 4, in some embodiments a width 31 of top member 24 is less than a distance 19 between right and left side walls 16 and 18 of floor tub assembly 12. In such embodiments, seat adapter assembly 10 may therefore include a right side filler panel 33 and a left side filler panel 35. Right side filler panel 33 has a width 39 sufficient to span a gap between at least right side portion 32 of top member 24 and right side wall 16 of floor tub assembly 12. Similarly, left side filler panel 35 has a width 41 sufficient to span a gap between at least left side portion 30 of top member 24 and left side wall 18 of floor tub assembly 12.

Seat adapter assembly 10 may be used as follows to convert a long form vehicle configuration into a short form vehicle configuration. Alternatively, seat adapter assembly 10 could also be used in a short form vehicle configuration to allow a third row of OEM seats to be mounted within the vehicle in the third row seating position.

A first step in the conversion process is to position seat adapter assembly 10 in the installed position 46 within floor tub assembly 12. See FIGS. 2-4. When located in the installed position 46, seat adapter assembly 10 will be located largely in the second row seating area (e.g., in a long form conversion vehicle), typically at a forward-most position with respect to floor tub assembly 12. When located in the installed position 46, top member 24 of seat adapter assembly 10 will be substantially co-planar (i.e., at the same level) with portions of the OEM floor (e.g., respective right and left sill portions 45 and 47 of conversion vehicle 11) in the second row seating area. If seat adapter assembly 10 is to be used on a short form vehicle, then seat adapter assembly 10 would be located largely in the third row seating area.

In any event, and after having been properly located in the installed position 46, the right side member 34 of seat adapter assembly 10 may be secured to floor tub assembly 12. In the particular embodiments shown and described herein, fasteners 37, such as bolts and nuts, may be used to secure right side member 34 to floor tub assembly 12. See FIG. 3. Similarly, left side member 40 may be secured to floor tub assembly 12. Fasteners 37 (e.g., bolts and nuts) may be used for this purpose.

If provided, front member 44 also may be secured to floor tub assembly 12 by one or more fasteners 37, such as bolts and nuts. If provided, right and left side filler panels 33 and 35 may be secured to top member 24 and to right and left side sill portions 45 and 47, respectively, of mobility conversion vehicle 11, as best seen in FIG. 2. After seat adapter assembly 12 has been mounted to floor tub assembly 12, rear member 60 may be mounted to seat adapter assembly 10 to enclose the interior region 52 (FIG. 3) defined between seat adapter assembly 10 and lowered floor section 14 of floor tub assembly 12.

Thereafter, one or more OEM seats 80, such as one or more OEM second row seats (e.g., for a long form conversion) or one or more OEM third row seats (e.g., for a short form conversion), may be mounted to top member 24 of seat adapter assembly 10, e.g., at mounting locations 74 (FIG. 4) provided on seat adapter assembly 10. In some embodiments, OEM seat mounts 76 may be mounted directly to mounting locations 74 defined by seat adapter assembly 10. In other embodiments, e.g., wherein OEM seats 80 are mounted to OEM seat track assemblies 78, seat track assemblies 78 may be mounted to mounting locations 74 of seat adapter assembly 10. See FIG. 2. The outboard portions of OEM seats 80 may be mounted to outboard OEM seat mounting locations (not specifically shown) provided on the right and left sill portions 45 and 47 of conversion vehicle 11.

A significant advantage of seat adapter assembly 10 according to the disclosed instrumentalities is that it allows a long form mobility assist vehicle 11 (i.e., having no provisions to mount OEM second row seats in the second row seating area) to be readily converted to a short form mobility assist vehicle in which OEM second row seats are located in the second row seating area. Conversion vehicle manufacturers may therefore dispense with the need to provide two different types of conversions (i.e., long form and short form conversions) in order to offer customers vehicles having seating arrangements consistent with both long and short form conversions. If a customer desires a short form conversion, seat adapter assembly 10 could simply be added to the long form conversion vehicle. The OEM second row seats may then be mounted in the second row seating area, thereby preserving the 'look and feel' of a short form conversion vehicle, even though the vehicle is a long form conversion vehicle.

Still other advantages are associated with the disclosed instrumentalities. For example, a customer who purchased and used a long form conversion vehicle may readily convert the vehicle to the short form configuration (e.g., as may be required by changes in vehicle use or if selling the vehicle) by simply installing seat adapter assembly 10. The OEM second row seats may then be mounted to seat adapter assembly 10. Of course, the vehicle could be readily converted back into the long form conversion by simply removing seat adapter assembly 10.

Still yet another advantage of the seat adapter assembly 10 according to the disclosed instrumentalities is that it may be used even with short form conversion vehicles. That is, when installed in a short form conversion vehicle, the seat adapter assembly 10 will permit OEM seats to be mounted in the third row seating area.

Having briefly described the seat adapter assembly 10, as well as some of its more significant features and advantages, various embodiments and alternative configurations of the seat adapter assembly according to the disclosed instrumentalities will now be described in detail. However, before proceeding with the description, it should be noted that while the disclosed instrumentalities are shown and described herein as they could be used in conjunction with a mini-van type long form conversion vehicle 11, they could also be used with other types of conversion vehicles, either now known in the art or that may be developed in the future, having lowered floor sections to accommodate mobility assist systems. Consequently, the disclosed instrumentalities should not be regarded as limited to use with any particular type or style of mobility assist vehicle.

Referring back now to FIGS. 1 and 2, and as briefly described above, seat adapter assembly 10 may be used to convert a long form vehicle configuration to a short form configuration. In the long form vehicle configuration, the lowered floor section 14 of the floor tub assembly 12 extends from rear opening 13 of conversion vehicle 11 forward through the third and second row seating areas, ending just aft of the first row seating area 15, as best seen in FIG. 1. In such a long form configuration, the mobility assist conversion vehicle 11 will typically not have any OEM seats 80 installed either the second or third row seating areas. However, in some embodiments, a reduced size seat 81 may be mounted adjacent lowered floor section 14 in either or both of the second or third row seating areas. See FIG. 1 (reduced size seat 81 is shown only in the second row seating area of FIG. 1). In addition, and as was briefly described earlier, seat adapter assembly 10 may also be used to convert a short form vehicle configuration, i.e., where the floor tub extends to just aft of or behind the second row seating area. When installed in the floor tub of a short form conversion vehicle, seat adapter assembly 10 would allow one or more third row OEM seats to be installed in the third row seating area.

In any event, and regardless of the particular type of conversion vehicle 11 (e.g., long or short cut), floor tub assembly 12 may comprise a lowered floor section 14 sized to receive one or more mobility assist systems (not shown). In a long cut conversion, floor tub assembly 12 will typically accommodate two wheelchairs (not shown) in a tandem arrangement. Some embodiments may also accommodate a single medical stretcher (also not shown). Floor tub assembly 12 may include or define a right side wall 16 and a left side wall 18, both of which extend generally upwardly from the lowered floor section 14. See also FIGS. 4 and 5. Deployable ramp assembly 20 mounted to rear section 22 of floor tub assembly 12 may be extended and retracted through rear opening 13 of mobility assist vehicle 11 to allow persons to enter and exit the vehicle 11.

Referring now to FIGS. 2-4 and 6, seat adapter assembly 10 may comprise a top member 24 having an upper surface 21 and a lower surface 23. In the particular embodiments shown and described herein, top member 24 may comprise a generally rectangularly-shaped member having a front portion 26, a rear portion 28, a left side portion 30, and a right side portion 32, as best seen in FIG. 4. Top member 24 may also define a plurality of mounting locations 74 thereon sized and configured to receive OEM seat mounts 76. See FIG. 2. In the particular embodiments shown and described herein, OEM seat mounts 76 may comprise OEM seat track assemblies 78 that allow second row OEM seats 80 to slide along OEM track assemblies 78 between at least a forward position and an aft position. Alternatively, in other embodiments, OEM seat mounts 76 may comprise brackets that hold second row OEM seats 80 in fixed positions.

Seat adapter assembly 10 may also include a right side member 34 and a left side member 40 mounted in spaced-apart relation to one another. Right side member 34 may be mounted to lower surface 23 of top member 24 at about the right side portion 32 so that right side member 34 extends generally downwardly from top member 24, as best seen in FIGS. 3 and 6. Similarly, left side member 40 may be mounted to lower surface 23 of top member 24 at about the left side portion 30 so that left side member 40 extends generally downwardly from top member 24.

Right and left side members 34 and 40 may define one or more mounting locations 36 thereon to allow right and left side members 34 and 40 to be mounted or secured to floor tub assembly 12, as best seen in FIG. 3. Each mounting location 36 may comprise a hole or opening sized to receive a fastener system 37, such as a nut and a bolt, to allow right and left side members 34 and 40 to be removably mounted to floor tub assembly 12. In some embodiments, the bolts of fastener system 37 may be captively secured (e.g., by welding) to lower cross members 88 of right and left side members 34 and 40 to facilitate installation. The right and left side members 34 and 40 provide a direct load path for forces applied by the OEM seat mounts 76 to vehicle 11 thereby improving the ability of seat adapter assembly 10 to pass any applicable safety or collision tests (commonly referred to as 'pull tests') to ensure that the OEM vehicle seats 80 and/or seat belt systems (not shown) will not pull-out or become detached from seat adapter assembly 10 during an accident.

Figure 7:
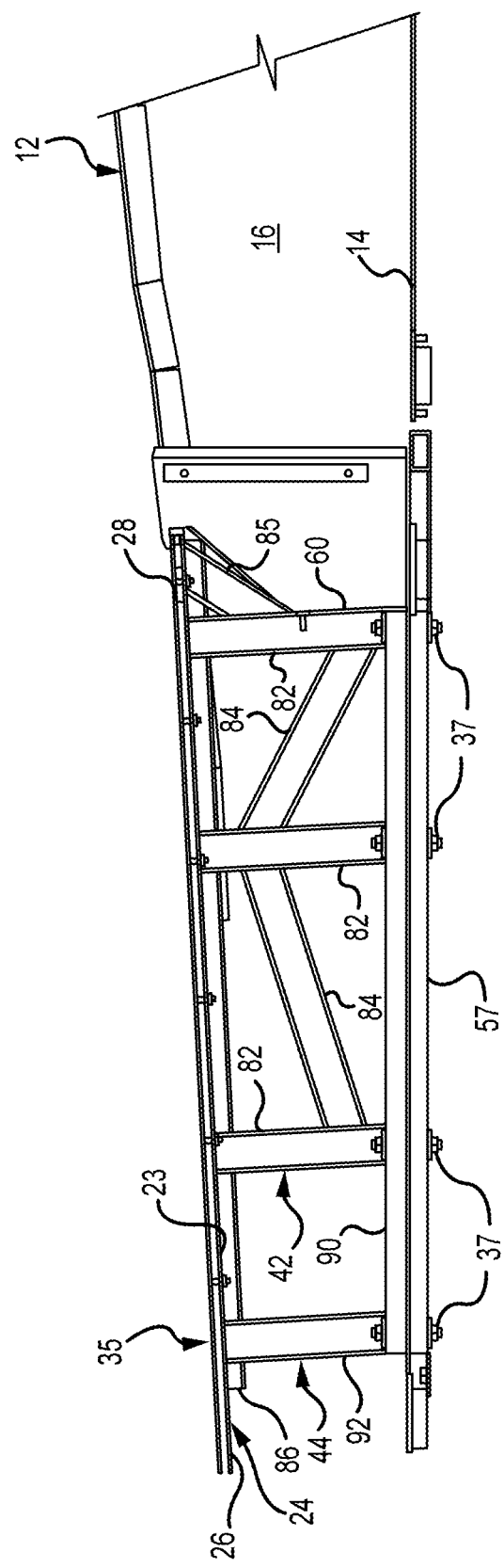
FIG. 7 is a left side view in elevation of the seat adapter assembly in the installed position.

In accordance with the foregoing considerations and in the particular embodiments shown and described herein, right side member 34 may comprise a right side truss 38, whereas left side member 40 may comprise a left side truss 42, as best seen in FIGS. 3, 6, and 7. The right and left side trusses 38 and 42 may be substantially identical one another and may comprise a plurality of vertical members 82 positioned in spaced-apart relation. Vertical members 82 may be connected or joined together by a plurality of diagonal members 84. Vertical members 82 may be connected or mounted to longitudinal members 87, which in turn may be secured or mounted to lower surface 23 of top member 24. Longitudinal members 87, together with top member 34, define the mounting locations 74 (FIG. 4) for OEM seat mounts 76. Right and left side trusses 38 and 42 may be held in spaced-apart relation by a plurality of upper cross members 86 and lower cross members 88, as best seen in FIG. 6.

If desired, a pair of longitudinal stabilizer members 90 may be used to connect together the outer portions of lower cross members 88. In some embodiments, right and left side trusses 38 and 42 may also comprise gusset members 85 to support the rear portion 28 of top member 24. See also FIG. 3.

The various components of right and left side trusses 38 and 42 may be fabricated from any of a wide range of materials, such as metals and metal alloys, suitable for the particular application. By way of example, in the particular embodiments shown and described herein, various members 82, 84, 86, 87, and 88 may comprise steel tube members having rectangular cross-sections. Stabilizer members 90 may comprise flat steel members. The various members 82, 84, 86, 87, 88, and 90 may be welded together. Alternatively, some or all of the various members comprising right and left side trusses 38 and 42 may be connected or joined together by any of a wide variety of fastening systems, such as nuts and bolts.

In some embodiments, seat adapter assembly 10 may also include a front member 44. Front member 44 may be mounted to lower surface 23 of top member 24 at about the front portion 26 of top member 24 so that front member 44 extends generally downwardly from top member 24. See FIGS. 3, 6, and 7. Front member 44 is sized so that it extends between top member 24 and the lowered floor section 14 of floor tub assembly 12 when seat adapter assembly 10 is located in an installed position 46 within floor tub assembly 12. Front member 44 may define at least one mounting location 48 thereon to allow front member 44 to be mounted or secured to floor tub assembly 12.

In the particular embodiments shown and described herein, front member 44 may comprise a pair of vertical members 92. Vertical members 92 may be connected or mounted to longitudinal members 87. Upper and lower cross members 94 and 96 mounted to vertical members 92 hold vertical members 92 in spaced-apart relation, as best seen in FIG. 6. Each mounting location 48 of front member 44 may comprise a hole or opening sized to receive a fastener system 37, such as nuts and bolts, to allow front member 44 to be secured to floor tub assembly 12. In some embodiments, the bolts of fastening system 37 may be captively secured (e.g., by welding) lower cross member 96 to facilitate installation. The various components of front member 44 fabricated from any of a wide range of materials, such as metals and metal alloys, suitable for the particular application. By way of example, in the particular embodiments shown and described herein, various members 92, 94, and 96 of front member 44 may comprise steel tube members having rectangular cross-sections. The various members 92, 94, and 96 of front member 44 may be welded together. Alternative, one or more of the various members of front member 44 may connected or joined together by any of a wide variety of fastening systems, such as by nuts and bolts.

Seat adapter assembly 10 may also include a rear member 60. Rear member 60 may be mounted to rear portion 28 of top member 24 so that rear member 60 extends generally downwardly from top member 24. Rear member 60 is sized so that it extends between top member 24 and the lowered floor section 14 of floor tub assembly 12 when seat adapter assembly 10 is located in the installed position 46. See FIGS. 2 and 4. Rear member 60 may define at least one mounting location 62 thereon to allow rear member 60 to be removably mounted or secured to seat adapter assembly 10 to allow access to the fasteners 37 to facilitate installation and removal of seat adapter assembly 10. See FIG. 3.

With reference now primarily to FIG. 4, in some embodiments the width 31 of top member 24 is less than a distance 19 between right and left side walls 16 and 18 of floor tub assembly 12. Seat adapter assembly 10 may therefore include a right side filler panel 33 and a left side filler panel 35. Right side filler panel 33 has a width 39 sufficient to span a gap between the right side portion 32 of top member 24 and the right side wall 16 of floor tub assembly 12. Similarly, left side filler panel 35 has a width 41 sufficient to span a gap between the left side portion 30 of top member 24 and the left side wall 18 of floor tub assembly 12.

In the particular embodiments shown and described herein, the width 39 of right side filler panel 33 is sufficient to extend beyond the right side wall 16 of floor tub assembly 12, thereby allowing right side filler panel 33 to be secured to the right side sill portion 45 (FIG. 2) of conversion vehicle 11 via one or more mounting locations 89 provided on outboard edge 91 of right side filler panel 33 (FIG. 4). Similarly, the width 41 of left side filler panel 35 is sufficient to extend beyond the left side wall 18 of floor tub assembly 12, thereby allowing left side filler panel 35 to be secured to the left side sill portion 47 (FIG. 2) of conversion vehicle 11. Mounting locations 89 provided on outboard edge 93 of left side filler panel 35 may be provided for this purpose. In some embodiments, one or more transverse stiffener members 98 may be attached to lower surface 97 of left side filler panel 35. See FIGS. 3 and 6. Similar transverse stiffener members may be provided on the lower surface of right side filler panel 35, if desired or required for a particular installation.

Top member 24, rear member 60, right and left side filler panels 33 and 35, and transverse stiffener member(s) 98 may be formed from sheet metal (such as sheet steel), although other materials or combinations of materials, such as composite materials, could be used as well, as would become apparent to persons having ordinary skill in the art after having become familiar with the teachings provided herein. Consequently, the disclosed instrumentalities should not be regarded as limited to any particular materials.

Figure 5:
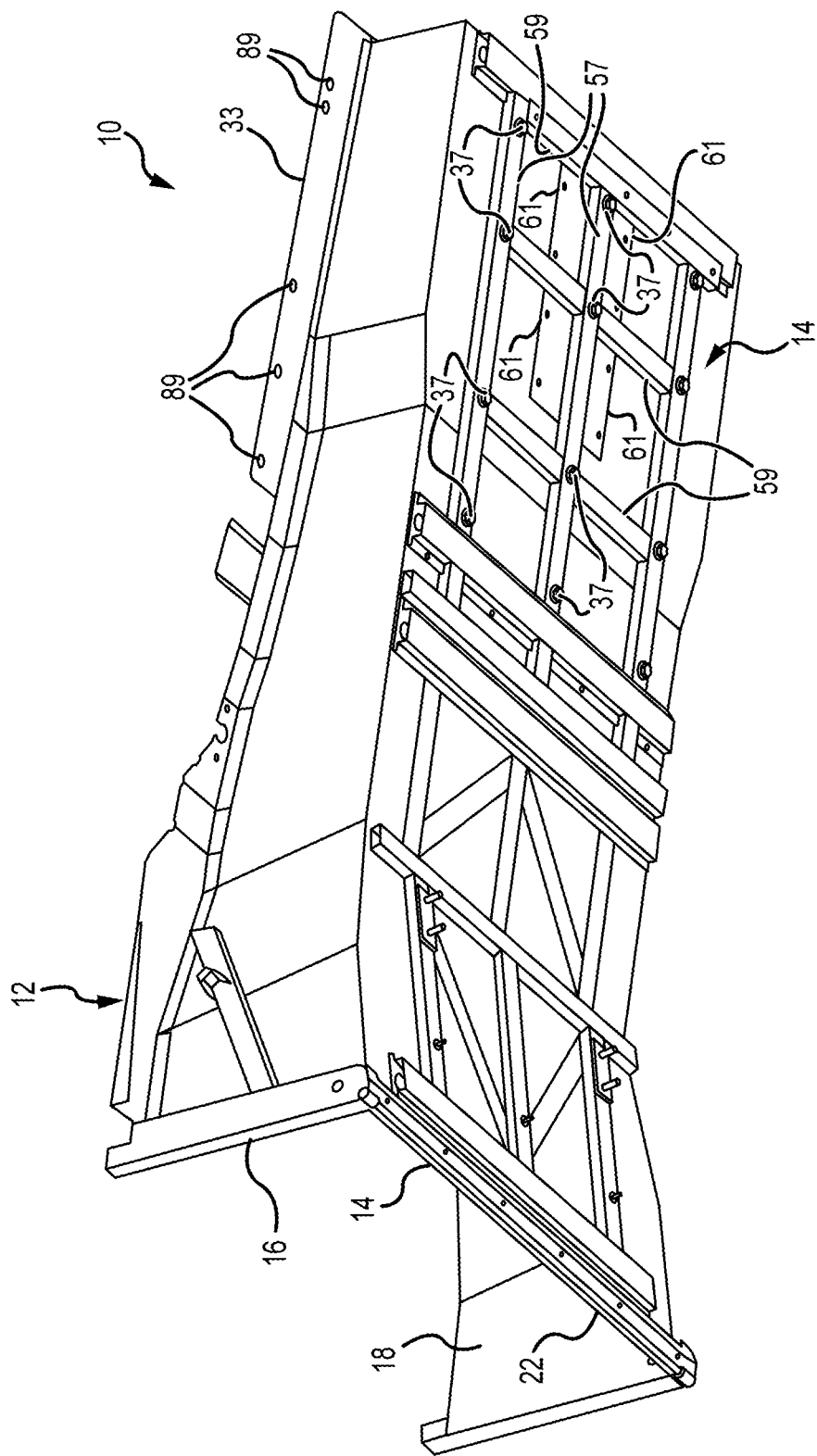
FIG. 5 is an isometric view of the bottom side of the floor tub assembly illustrated in FIG. 4.

Depending on the design and configuration of the particular floor tub assembly 12, it may be desirable to ensure that the lowered floor section 14 has sufficient strength to withstand the loads imposed by second row OEM seats 80 via seat adapter assembly 10. Referring now to FIG. 5, in one embodiment, lowered floor section 14 of floor tub assembly 12 is provided with a plurality of longitudinal and transverse stiffener members 57 and 59. Longitudinal stiffener members 57 may be provided with corresponding openings or holes therein sized to receive fasteners 37 of seat adapter assembly 10. One or more reinforcing plates 61 may be provided to further increase the strength and rigidity of lowered floor section 61.

Longitudinal and transverse stiffener members 57 and 59, as well as reinforcing plates 61 may be fabricated from any of a wide range of materials, such as steel, that would be suitable for the intended application. Longitudinal and transverse stiffener members 57 and 59 may comprise may comprise steel tube members having rectangular cross-sections. Longitudinal and transverse stiffener members 57 and 59, and reinforcing plates 61 may be welded to the bottom surface of lowered floor section 14, although other fastening systems could also be used.

As was briefly described earlier, seat adapter assembly 10 may be used to convert a long form vehicle configuration into a short form vehicle configuration. Alternatively, seat adapter assembly 10 could also be used in a short form vehicle configuration to allow a third row of OEM seats to be mounted within the vehicle, i.e., to provide OEM seats in both the second and third row seating areas.

A first step in the conversion process involves positioning seat adapter assembly 10 in the installed position 46 within floor tub assembly 12. When located in the installed position 46, seat adapter assembly 10 will be located largely in the second row seating area (e.g., for a long form conversion vehicle), typically at a forward-most position with respect to the floor tub assembly 12. When located in the installed position 46, top member 24 of seat adapter assembly 10 will be substantially co-planar with portions of the OEM floor in the second row seating area, such as right and left sill portions 45 and 47 of conversion vehicle 11. If the conversion process is to be used on a short form vehicle, then seat adapter assembly 10 would be located largely in the third row seating area and top member 24 would be substantially co-planar with portions of the OEM floor in the third row seating area.

After having been properly located in the installed position 46, right side member 34 of seat adapter assembly 10 may be secured to floor tub assembly 12. In the particular embodiments shown and described herein, fasteners 37, such as bolts and nuts, may be used to secure right side member 34 to floor tub assembly 12. See FIG. 3. Similarly, left side member 40 may be secured to floor tub assembly 12 with fasteners 37. If provided, front member 44 also may be secured to floor tub assembly 12 by one or more fasteners 37.

In embodiments using right and left side filler panels 33 and 35, right and left side filler panels 33 and 35 may be secured to top member 24. The outboard portion 91 of right side filler panel 33 may be secured to the right side sill portion 45 of mobility conversion vehicle 11. Similarly, outboard portion 93 of left side filler panel 35 may be secured to the left side sill portion 47. Rear member 60 may be mounted to seat adapter assembly 10 to enclose the interior region 52 (FIG. 3) defined between seat adapter assembly 10 and lowered floor section 14 of floor tub assembly 12.

Thereafter, one or more OEM seats, such as one or more OEM second row seats 80 (for a long form conversion) or one or more OEM third row seats (for a short form conversion), may be mounted to seat adapter assembly 10, e.g., at mounting locations 74 (FIG. 4). In some embodiments, OEM seat mounts 76 may be mounted directly to mounting locations 74 defined by seat adapter assembly 10. In other embodiments, e.g., wherein OEM seats 80 are mounted to OEM seat track assemblies 78, seat track assemblies 78 may be mounted to mounting locations 74 of seat adapter assembly 10. See FIG. 2. The outboard portions of OEM seats 80 may be mounted to outboard OEM seat mounting locations (not specifically shown) provided on the right and left sill portions 45 and 47 of conversion vehicle 11.

Still other embodiments of seat adapter assembly are possible and could be used. For example, another embodiment 110 of a seat adapter assembly according to the disclosed instrumentalities is illustrated in FIGS. 8-11. Seat adapter assembly 110 may comprise a top member 124 that defines at least a front portion 126, a rear portion 128, a left side portion 130, and a right side portion 132. A right side member 134 is mounted to the right side portion 132 of top member 124 so that right side member 134 extends generally downwardly from top member 124. Right side member 134 may define at least one mounting location 136 thereon to allow right side member 134 to be mounted or secured to the right side wall 116 of floor tub assembly 112. In the particular embodiments shown in FIGS. 8-11, right side member 134 may take the form of a right side flange 138. Each mounting location(s) 136 of right side member 134 may comprise a hole or opening in right side member 134 sized to receive a fastener system, such as a nut and a bolt (not shown) to allow right side member 134 to be bolted to the right side wall 116 of floor tub assembly 112.

Seat adapter assembly 110 may also comprise a left side member 140. Left side member 140 may be mounted to the left side portion 130 of top member 124 so that left side member 140 extends generally downwardly from top member 124. Left side member 140 may also define at least one mounting location 136 thereon to allow left side member 140 to be mounted or secured to the left side wall 118 of floor tub assembly 112. In the particular embodiments shown in FIGS. 8-11, left side member 140 may comprise a left side flange 142. As was the case for right side member 134, each mounting location(s) 136 of left side member 140 may comprise a hole or opening in left side member 140 sized to receive a fastener system, such as a nut and a bolt (not shown) to allow left side member 140 to be bolted to the left side wall 118 of floor tub assembly 112.

Seat adapter assembly 110 may also include a front member 144. Front member 144 is mounted to the front portion 126 of top member 124 so that front member 144 extends generally downwardly from top member 124. Front member 144 is sized so that it extends between top member 124 and the lowered floor section 114 of floor tub assembly 112 when seat adapter assembly 110 is located in an installed position 146 within floor tub assembly 112. See FIGS. 8 and 11. Front member 144 may define at least one mounting location 148 thereon to allow front member 144 to be mounted or secured to the lowered floor section 114 of floor tub assembly 112. Front member 144 may define one or more openings 150 therein to allow access to an interior region 152 defined between seat adapter assembly 110 and floor tub assembly 112 when seat adapter assembly 110 is in the installed position 146. See FIG. 11. The mounting location(s) 148 defined by front member 144 may comprise a mounting flange 154 having an elongated slot 156 provided therein. Slot 156 may be sized to receive a length of a cargo tie-down system, such as "L-track" 158. L-track 158 will provide an additional mounting point to secure mounting flange 154 to lowered floor section 114 of floor tub assembly 112. Alternatively, other mounting arrangements may be used.

Figure 8:
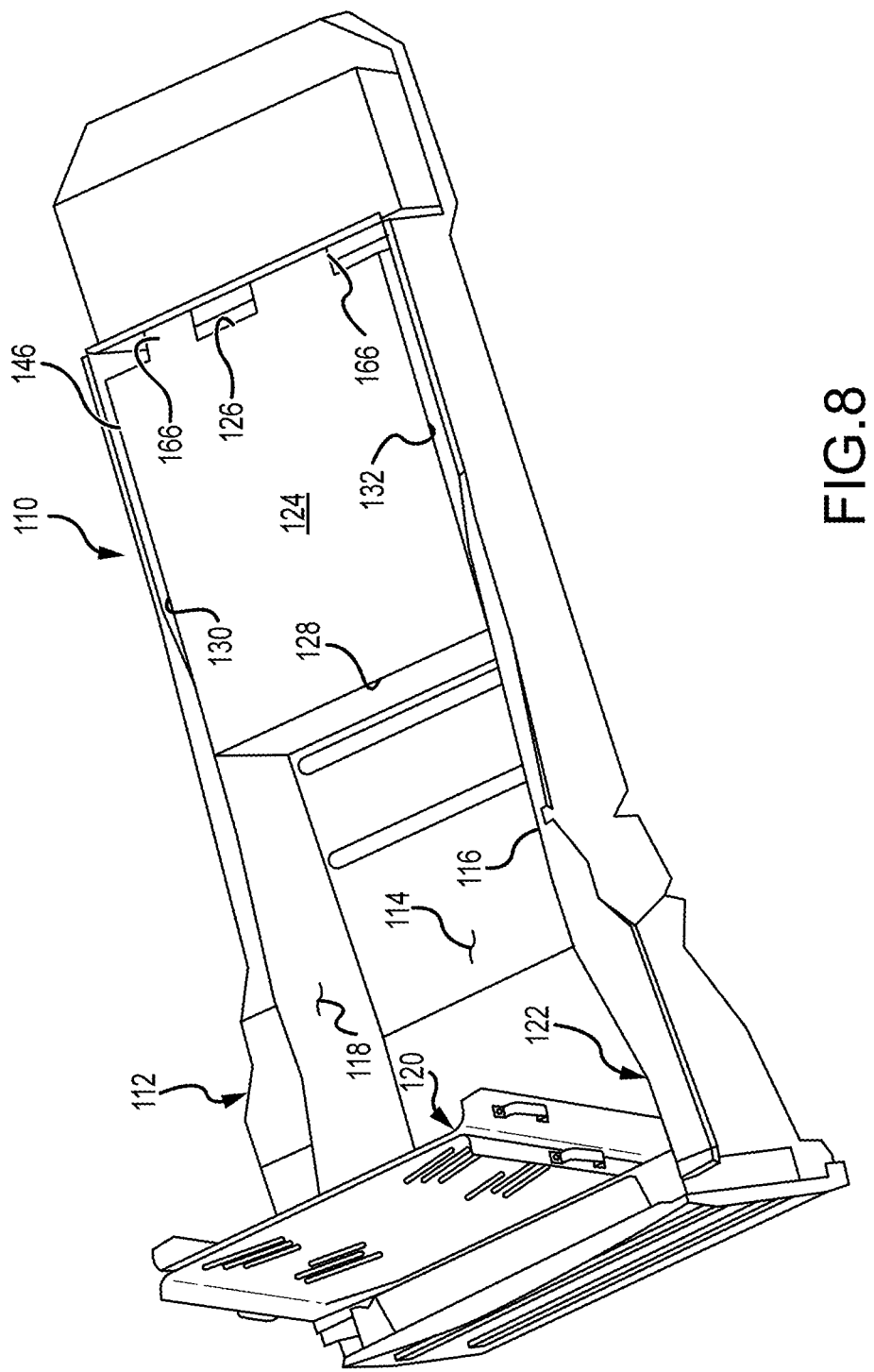
FIG. 8 is an isometric view of another embodiment of a seat adapter assembly in an installed position within a floor tub assembly.
Figure 11:
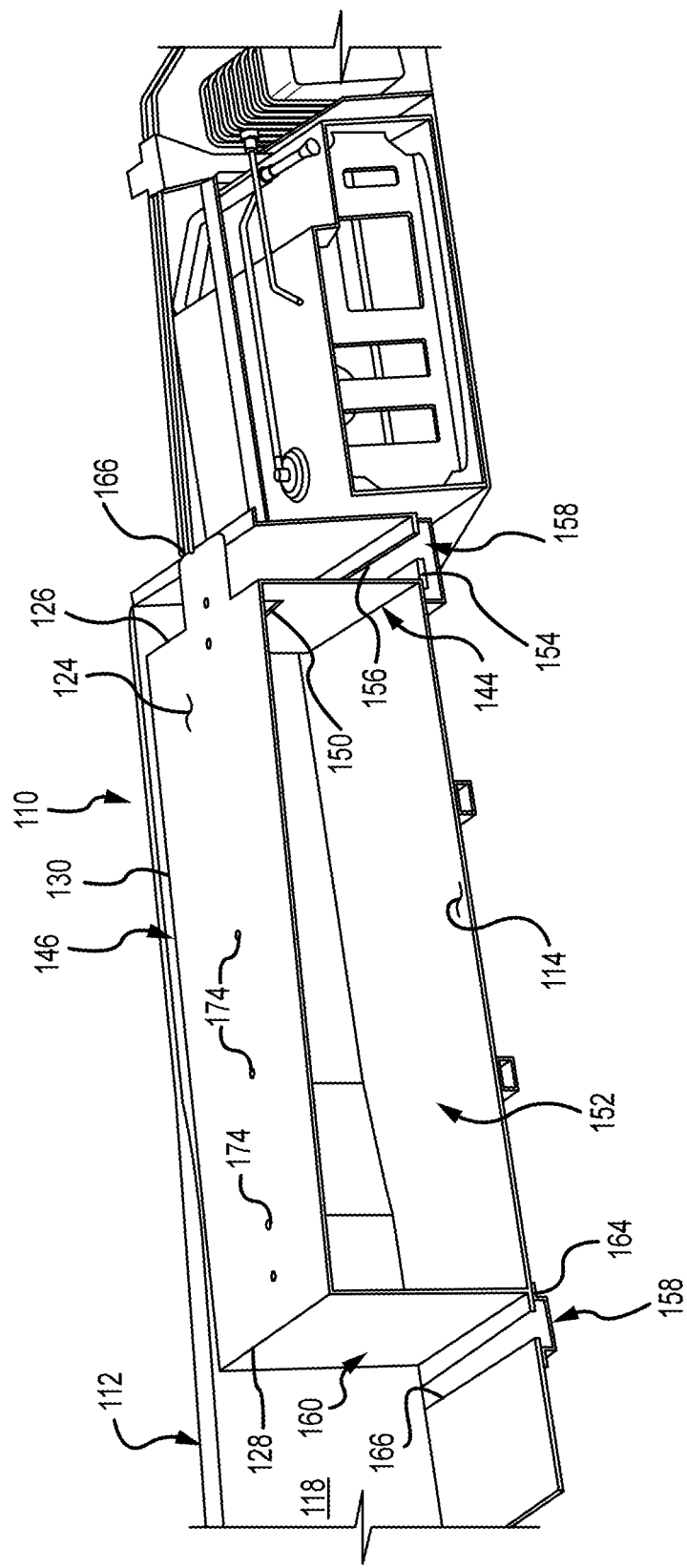
FIG. 11 is a sectional view of the seat adapter assembly illustrated in FIG. 8 in the installed position.

Seat adapter assembly 110 may also include a rear member 160. Rear member 160 is mounted to the rear portion 128 of top member 124 so that rear member 160 extends generally downwardly from top member 124. Rear member 160 is sized so that it extends between top member 124 and the lowered floor section 114 of floor tub assembly 112 when seat adapter assembly 110 is located in the installed position 146 (FIGS. 8 and 11). Rear member 160 may define at least one mounting location 162 thereon to allow rear member 160 to be mounted or secured to the lowered floor section 114 of floor tub assembly 112. The mounting location(s) 162 defined by rear member 160 may comprise a mounting flange 164 having an elongated slot 166 provided therein. In some embodiments, slot 166 of mounting flange 164 may be sized to receive a length of "L-track" 158, which may be used to secure mounting flange 164 to lowered floor section 114 of floor tub assembly 112. Alternatively, other mounting arrangements may be used.

Figure 9:
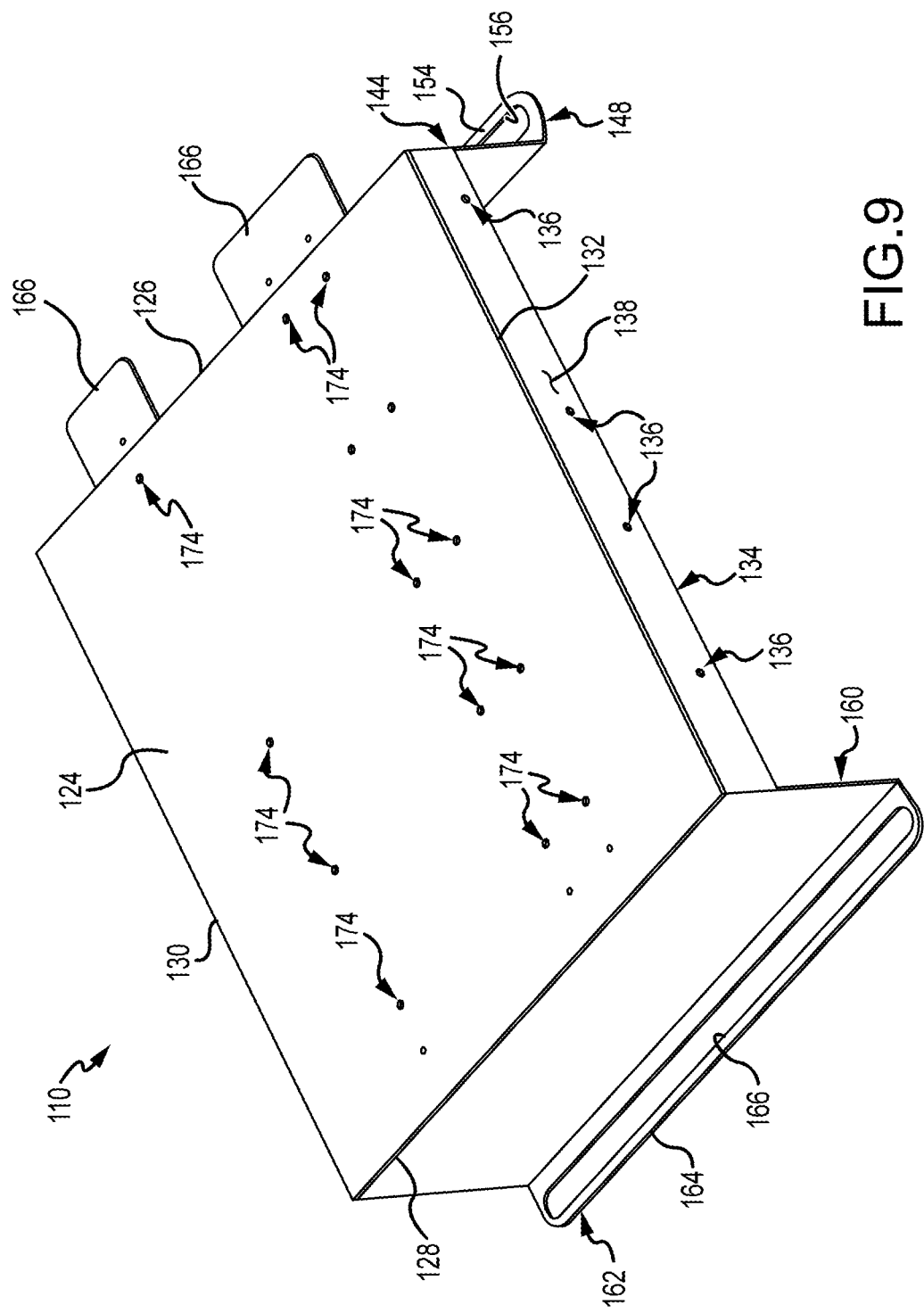
FIG. 9 is an isometric view of the top side of the seat adapter assembly illustrated in FIG. 8.

The various portions of seat adapter assembly 110, namely, top member 124, right and left side members 134 and 140, front member 144, and rear member 160, and related components (e.g., the various flanges) may be formed from a single piece of sheet metal (such as sheet steel), cut and formed to create the various elements of seat adapter assembly 110. Alternatively, seat adapter assembly 110 could be built up from separate components, e.g., as a weldment. In embodiments wherein the seat adapter assembly 110 is formed from a single piece of sheet metal, the openings 150 in front member 144 may be pre-cut before bending, thereby forming tabs 166 that extend from the front portion 126 of top member 124, as best seen in FIGS. 8-10.

Figure 10:
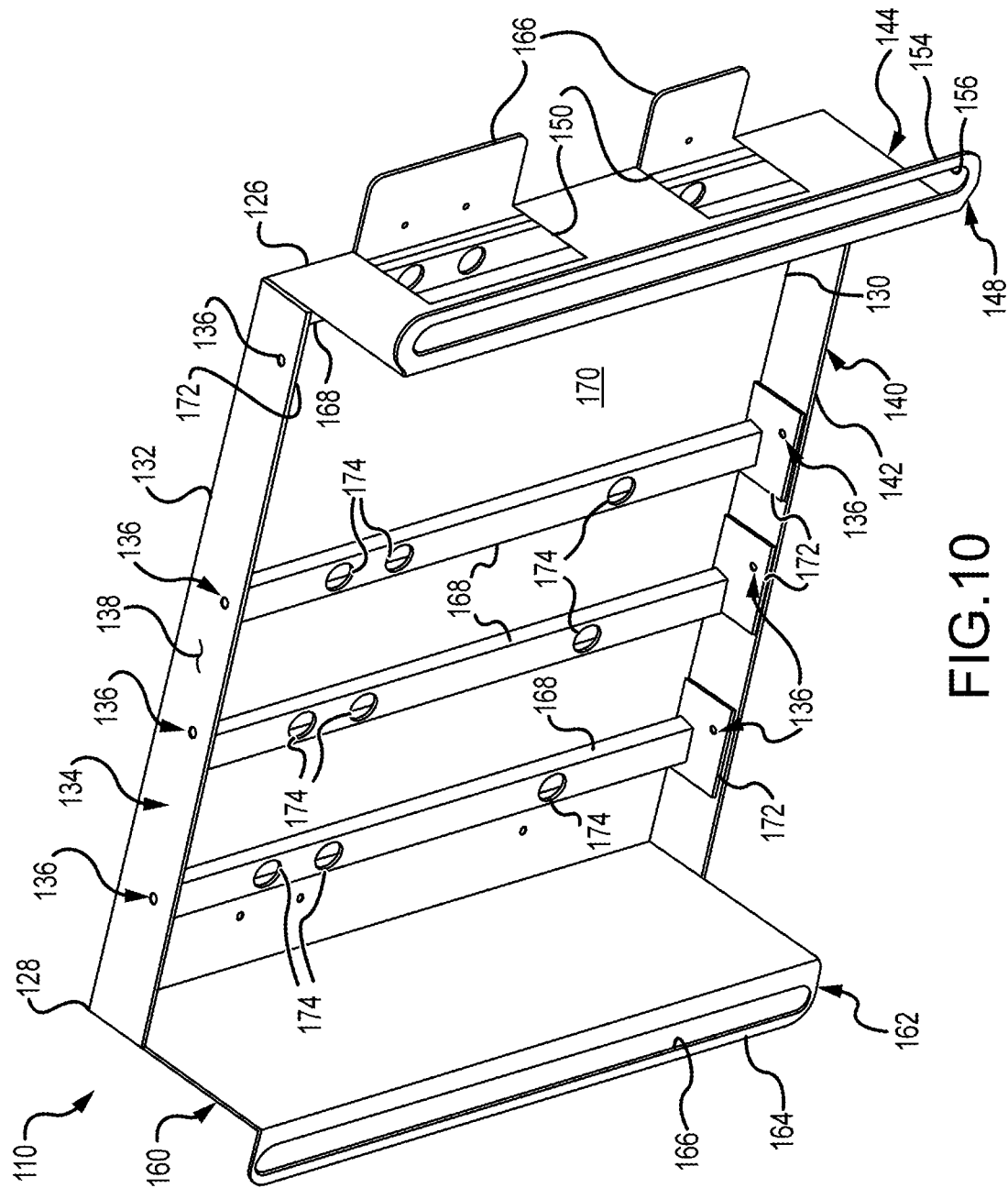
FIG. 10 is an isometric view of the bottom side of the seat adapter assembly illustrated in FIG. 8.

With reference now primarily to FIG. 10, seat adapter assembly 110 may also comprise one or more lateral stiffener members 168 mounted to a bottom surface 170 of top member 124. Lateral stiffener members 168 may extend substantially between the left and right side portions 130 and 134 of top member 124 and may be provided with respective end flanges thereon 172 that may be used to form a part of mounting locations 136. Besides stiffening top member 124 and allowing top member 124 to support one or more OEM seats without excessive deflection, each lateral stiffener member 168 may be mounted at a location coincident with mounting locations (not shown) of the OEM vehicle seats. That is, top member 124 and lateral stiffener members 168 may together define mounting locations 174 for the OEM vehicle seats. In some embodiments, the OEM vehicle seats may be mounted to one or more seat tracks, in which case the lateral stiffener members 160 may be mounted to bottom surface 170 of top member 124 so that the mounting locations 174 defined thereby are provided at locations coincident with mounting locations for the seat tracks.

Lateral stiffener members 168 may be fabricated from any of a wide range of materials, such as sheet metal, that would be suitable for the intended application. By way of example, in one embodiment, lateral stiffener members 168 and associated flanges 172 are fabricated from sheet steel. The lateral stiffener members 168 and associated flanges 172 may be welded to the bottom surface of top member 124.

In this regard it should be noted that because seat adapter assembly 110 will typically be used to support and mount at least portions of the second row OEM vehicle seats, seat adapter assembly 110 will need to be made of materials of sufficient strength to allow seat adapter assembly 110 to pass any applicable tests (e.g., pull tests) to ensure that the OEM vehicle seats will not pull-out or become detached from seat adapter assembly 110 during an accident. Similarly, the seat adapter assembly 110 itself should not become detached from floor tub assembly 112. Any such requirements will need to be taken into account in determining the material strength, thickness, mounting arrangements, and methods used to attach the seat adapter assembly 110 to the floor tub assembly 112. However, because such measures would become readily apparent to persons having ordinary skill in the art after having become familiar with the teachings provided herein, and because such considerations will also depend to some degree on the particular vehicle, floor tub assembly, and OEM seats involved, the particular material types, thicknesses, strengths, and mounting arrangements that may be used will not be described in further detail herein.

The seat adapter assembly 110 may be used as follows to convert a long form vehicle configuration into a short form vehicle configuration. Seat adapter assembly 110 may also be used to convert a short form vehicle configuration, i.e., where the floor tub extends to just aft of the second row seating position, so that one or more OEM seats may be installed in the third row seating area.

A first step in the conversion process would be to position the seat adapter assembly 110 in the installed position 146 within floor tub assembly 112. See FIG. 8. When located in the installed position 146, seat adapter assembly 110 will be located largely in the second row seating area (e.g., for a long form conversion vehicle), typically at a forward-most position with respect to floor tub assembly 112. When located in the installed position 146, top member 124 of seat adapter assembly 110 will be substantially co-planar with portions of the OEM floor (typically outboard or right and left sill portions of the OEM floor) in the second row seating area. If the conversion process is to be used on a short form vehicle, then seat adapter assembly 110 would be located largely in the third row seating area.

In any event, and after having been properly located in the installed position 146, right side member 134 may be secured to right side wall 116 of floor tub assembly 112. Similarly, left side member 140 may be secured to left side wall 118 of floor tub assembly 112.

The front and rear members 144 and 160 may be secured to the lowered floor section 114 of floor tub assembly 112. In the particular embodiments shown in FIGS. 8-11, L-tracks 158 may be used to secure the mounting flanges 154 and 164 of respective front and rear members 144 and 160 to lowered floor section 114 of floor tub assembly 112. In this regard it should be noted that the engagement of the L-tracks 158 with the front and rear mounting flanges 154 and 164 does not provide a significant amount of structural strength in the mounting of seat adapter assembly 110 to floor tub assembly 112. The primary structural strength is provided by the right and left side members 134 and 140. If additional mounting strength is required, other types of fasteners or mounting systems may be used to mount or secure the front and rear members 144 and 160 to floor tub assembly 112, as would become apparent to persons having ordinary skill in the art after having become familiar with the teachings provided herein.

After the seat adapter assembly 110 has been mounted to floor tub assembly 112, one or more OEM seats, such as one or more OEM second row seats (for a long form conversion) or one or more OEM third row seats (for a short form conversion), may be mounted to top member 124 of seat adapter assembly 110, e.g., at mounting locations 174. In some embodiments, the OEM seats may be mounted directly to top member 124. In other embodiments, wherein the OEM seats are mounted to seat tracks, the seat tracks may be mounted to the top member 124 of seat adapter assembly 110 in the manner already described for seat adapter assembly 10.

Unless defined otherwise, all technical and scientific terms used herein have the same meaning as commonly understood by persons having ordinary skill in the art to which the invention pertains. Although any systems, methods, and materials similar or equivalent to those described herein can be used in practice for testing of the present invention, the preferred systems, methods, and materials are described herein.

In understanding the scope of the present invention, the articles "a" and "an" are used herein to refer to one or to more than one (i.e., to at least one) of the grammatical object of the article. By way of example, "an element" means one element or more than one element. The term "comprising" and its derivatives, as used herein, are intended to be open ended terms that specify the presence of the stated features, elements, components, groups, and/or steps, but do not exclude the presence of other unstated features, elements, components, groups, and/or steps. The foregoing also applies to words having similar meanings such as the terms, "including," "having" and their derivatives. Any terms of degree such as "substantially," "about" and "approximate" as used herein mean a reasonable amount of deviation of the modified term such that the end result is not significantly changed. When referring to a measurable value, such as an amount, a temporal duration, and the like, these terms are meant to encompass variations of at least ±20% or ±10%, more preferably ±5%, even more preferably ±1%, and still more preferably ±0.1% from the specified value, as such variations are appropriate and as would be understood by persons having ordinary skill in the art to which the invention pertains.

Throughout this disclosure, various aspects of the invention may be presented in a range format. It should be understood that the description in a range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.6, 3, 4, 5, 5.7, and 6. This applies regardless of the breadth of the range.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adapted to another embodiment. It should be noted that while the present invention is shown and described herein as it could be used in conjunction with a configuration of various components, it could be utilized with other configurations, either now known in the art or that may be developed in the future, so long as the objects and features of the invention are achieved, as would become apparent to persons having ordinary skill in the art after having become familiar with the teachings provided herein. Consequently, the present invention should not be regarded as limited to that shown and described herein. It is not necessary for all advantages to be present in a particular embodiment at the same time. Thus, the foregoing descriptions of the embodiments according to the present invention are provided for illustration only, and not for the purpose of limiting the invention as defined by the appended claims and their equivalents.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. A seat adapter assembly for a mobility assist vehicle, the mobility assist vehicle having a floor tub assembly that includes at least a lowered floor section, a right side wall that extends generally upwardly from the lowered floor section, and a left side wall that extends generally upwardly from the lowered floor section, said seat adapter assembly comprising:

a top member defining at least a front portion, a rear portion, a left side portion, and a right side portion;

a right side member mounted to the right side portion of said top member so that said right side member extends generally downwardly from said top member, said right side member defining at least one mounting location thereon to allow said right side member to be mounted to the floor tub assembly;

a left side member mounted to the left side portion of said top member so that said left side member extends generally downwardly from said top member, said left side member defining at least one mounting location thereon to allow said left side member to be mounted to the floor tub assembly;

a front member mounted to the front portion of said top member so that said front member extends between said top member and the lowered floor section of the floor tub assembly when said seat adapter is located in an installed position within the floor tub assembly; and a rear member mounted to the rear portion of said top member so that said rear member extends between said top member and the lowered floor section of the floor tub assembly when said seat adapter is located in the installed position within the floor tub assembly.

2. The seat adapter assembly of claim 1, wherein said front member defines at least one mounting location thereon to allow said front member to be mounted to the floor tub assembly.

3. The seat adapter assembly of claim 1, wherein said rear member defines at least one mounting location thereon to allow said rear member to be mounted to said seat adapter assembly.

4. The seat adapter assembly of claim 1, wherein said top member is substantially aligned with portions of an OEM floor of the mobility assist vehicle when said seat adapter assembly is located in the installed position within the floor tub assembly.

5. The seat adapter assembly of claim 1, wherein said top member defines at least one mounting location sized to receive an OEM seat mount for an OEM seat.

6. The seat adapter assembly of claim 1, wherein said top member defines at least one mounting location sized to receive an OEM seat mounting track for an OEM seat of the mobility assist vehicle, the OEM seat mounting track allowing the OEM seat to be moved between at least a forward position and a rearward position.

7. The seat adapter assembly of claim 1, wherein said top member has a width that is less than a distance between the right and left side walls of the floor tub assembly, said seat adapter further comprising:

a right side filler panel mounted to said top member, said right side filler panel having a width sufficient to span a gap between the right side portion of said top member and the right side wall of the floor tub assembly when said seat adapter is located in the installed position; and a left side filler panel mounted to said top member, said left side filler panel having a width sufficient to span a gap between the left side portion of said top member and the left side wall of said floor tub assembly when said seat adapter is located in the installed position.

8. The seat adapter assembly of claim 7, wherein said right side filler panel defines at least one mounting location thereon to allow said right side filler panel to be mounted to a right side portion of the mobility assist vehicle and wherein said left side filler panel defines at least one mounting location thereon to allow said left side filler panel to be mounted to a left side portion of the mobility assist vehicle.

9. The seat adapter assembly of claim 7, wherein said top member has a length that is about equal to a length of a second row seating area of the mobility assist vehicle, and wherein said right and left side filler panels have respective lengths that are about equal to the length of said top member.

10. The seat adapter assembly of claim 1, wherein the right side member comprises a truss having a plurality of vertical members positioned in spaced-apart relation and a plurality of diagonal members mounted to the vertical members, and wherein said left side member comprises a truss having a plurality of vertical members positioned in spaced-apart relation and a plurality of diagonal members mounted to the vertical members.

11. A method of converting a mobility assist vehicle to receive an OEM seat, the mobility assist vehicle having a floor tub assembly that includes at least a lowered floor section, a right side wall that extends generally upwardly from the lowered floor section, and a left side wall that extends generally upwardly from the lowered floor section, said method comprising:

providing a seat adapter assembly having:

a top member defining at least a front portion, a rear portion, a left side portion, and a right side portion;

a right side member mounted to the right side portion of said top member so that said right side member extends generally downwardly from said top member, said right side member defining at least one mounting location thereon to allow said right side member to be mounted to the floor tub assembly;

a left side member mounted to the left side portion of said top member so that said left side member extends generally downwardly from said top member, said left side member defining at least one mounting location thereon to allow said left side member to be mounted to the floor tub assembly;

a front member mounted to the front portion of said top member so that said front member extends between said top member and the lowered floor section of the floor tub assembly when said seat adapter is located in an installed position within the floor tub assembly; and a rear member mounted to the rear portion of said top member so that said rear member extends between said top member and the lowered floor section of the floor tub assembly when said seat adapter is located in the installed position within the floor tub assembly;

positioning the seat adapter assembly in the floor tub assembly;

securing the right side member of the seat adapter assembly to the floor tub assembly; and securing the left side member of the seat adapter assembly to the floor tub assembly.

12. The method of claim 11, wherein the front member of the seat adapter assembly defines at least one mounting location thereon and wherein the rear member of the seat adapter assembly defines at least one mounting location thereon, said method further comprising:

securing the front member of the seat adapter assembly to the floor tub assembly; and securing the rear member of the seat adapter assembly to the floor tub assembly.

13. The method of claim 12, further comprising mounting an OEM seat assembly to the seat adapter assembly.

14. The method of claim 13, wherein said mounting an OEM seat assembly to the seat adapter assembly further comprises:

mounting an OEM seat track to the top member of the seat adapter assembly; and mounting the OEM seat assembly to the OEM seat track.

15. The method of claim 11, further comprising:

mounting a right side filler panel to the top member and to a right side portion of the mobility assist vehicle to cover a gap between the right side portion of said top member and the right side wall of the floor tub assembly; and mounting a left side filler panel to the top member and to a left side portion of the mobility assist vehicle to cover a gap between the left side portion of said top member and the left side wall of the floor tub assembly.

16. A seat adapter assembly for a mobility assist vehicle, the mobility assist vehicle having a floor tub assembly that includes at least a lowered floor section and right and left side walls that extend generally upwardly from the lowered floor section, said seat adapter assembly comprising:

a top member having an upper surface and a lower surface, said top member defining mounting locations sized to receive an OEM seat mount for an OEM seat of the mobility assist vehicle;

a right side member mounted to the lower surface of said top member so that said right side member extends generally downwardly from the lower surface of said top member, said right side member defining at least one mounting location thereon to allow said right side member to be mounted to the floor tub assembly; and a left side member mounted to the lower surface of said top member so that said left side member extends generally downwardly from the lower surface of said top member and is in spaced-apart relation to said right side member, said left side member defining at least one mounting location thereon to allow said left side member to be mounted to the floor tub assembly.

17. The seat adapter assembly of claim 16, wherein said top member has a width that is less than a distance between the right and left side walls of the floor tub assembly, said seat adapter further comprising:

a right side filler panel mounted to said top member, said right side filler panel having a width sufficient to span a gap between the right side portion of said top member and the right side wall of the floor tub assembly when said seat adapter is located in the installed position; and a left side filler panel mounted to said top member, said left side filler panel having a width sufficient to span a gap between the left side portion of said top member and the left side wall of said floor tub assembly when said seat adapter is located in the installed position.

18. The seat adapter assembly of claim 17, wherein said right side filler panel defines at least one mounting location thereon to allow said right side filler panel to be mounted to a right side portion of the mobility assist vehicle and wherein said left side filler panel defines at least one mounting location thereon to allow said left side filler panel to be mounted to a left side portion of the mobility assist vehicle.

19. The seat adapter assembly of claim 17, wherein said top member has a length that is about equal to a length of a second row seating area of the mobility assist vehicle, and wherein said right and left side filler panels have respective lengths that are about equal to the length of said top member.

20. The seat adapter assembly of claim 16, wherein the right side member comprises a truss having a plurality of vertical members positioned in spaced-apart relation and a plurality of diagonal members mounted to the vertical members, and wherein said left side member comprises a truss having a plurality of vertical members positioned in spaced-apart relation and a plurality of diagonal members mounted to the vertical members.

21. The seat adapter assembly of claim 20, further comprising a plurality of cross members mounted to and extending between said right side member and said left side member.

22. The seat adapter assembly of claim 16 further comprising first and second longitudinal stiffener members mounted to the lower surface of said top member at about the mounting locations.

23. The seat adapter assembly of claim 16, further comprising a front member mounted to the lower surface of said top member so that said front member extends between the lower surface of said top member and the lowered floor section of the floor tub assembly when said seat adapter is located in an installed position within the floor tub assembly.

24. The seat adapter assembly of claim 23, further comprising a rear member mounted to said top member so that said rear member extends between said top member and the lowered floor section of the floor tub assembly when said seat adapter is located in the installed position within the floor tub assembly.

25. A method of converting a mobility assist vehicle to receive an OEM seat, the mobility assist vehicle having a floor tub assembly that includes at least a lowered floor section, a right side wall that extends generally upwardly from the lowered floor section, and a left side wall that extends generally upwardly from the lowered floor section, said method comprising:

providing a seat adapter assembly having:

a top member having an upper surface and a lower surface, said top member defining at least one mounting location sized to receive an OEM seat mount for an OEM seat of the mobility assist vehicle;

a right side member mounted to the lower surface of said top member so that said right side member extends generally downwardly from the lower surface of said top member, said right side member defining at least one mounting location thereon to allow said right side member to be mounted to the floor tub assembly; and a left side member mounted to the lower surface of said top member so that said left side member extends generally downwardly from the lower surface of said top member and is in spaced-apart relation to said right side member, said left side member defining at least one mounting location thereon to allow said right side member to be mounted to the floor tub assembly;

positioning the seat adapter assembly in the floor tub assembly;

securing the right side member of the seat adapter assembly to the floor tub assembly; and securing the left side member of the seat adapter assembly to the floor tub assembly.

26. The method of claim 25, wherein said mounting an OEM seat assembly to the seat adapter assembly further comprises:

mounting an OEM seat mount to the top member of the seat adapter assembly; and mounting the OEM seat assembly to the OEM seat mount.

27. The method of claim 25, further comprising:

mounting a right side filler panel to the top member and to a right side portion of the mobility assist vehicle to cover a gap between the right side portion of said top member and the right side wall of the floor tub assembly; and mounting a left side filler panel to the top member and to a left side portion of the mobility assist vehicle to cover a gap between the left side portion of said top member and the left side wall of the floor tub assembly.

\* \* \* \* \*